United States Patent [19]

Layden et al.

[11] Patent Number: 4,613,473
[45] Date of Patent: Sep. 23, 1986

[54] METHOD FOR FORMING COMPOSITE ARTICLES OF COMPLEX SHAPES

[75] Inventors: George K. Layden, Wethersfield; Karl M. Prewo, Vernon, both of Conn.

[73] Assignee: United Technologies Corporation, Hartford, Conn.

[21] Appl. No.: 602,284

[22] Filed: Apr. 20, 1984

[51] Int. Cl.⁴ .................. B29C 43/18; B29B 11/14
[52] U.S. Cl. .......................... 264/103; 65/33; 156/89; 264/60; 264/258; 264/324; 264/325; 264/332
[58] Field of Search .............. 264/324, 325, 332, 103, 264/113, 118, 122, 152, 258, DIG. 57, 29.1, 29.2, 29.5, 60, 63; 156/73.6, 89; 65/33, 18.1

[56] References Cited

U.S. PATENT DOCUMENTS

| | | | |
|---|---|---|---|
| 2,155,375 | 4/1939 | Jablonsky | 264/325 |
| 3,233,014 | 2/1966 | Bickerdike et al. | 264/29.1 |
| 3,292,991 | 12/1966 | Crawley | 264/29.2 |
| 3,620,892 | 11/1971 | Wincklhofer | 264/122 |
| 3,716,610 | 2/1973 | Goldstein | 264/152 |
| 3,772,115 | 11/1973 | Carlson et al. | 264/29.5 |
| 4,229,397 | 10/1980 | Fukuta et al. | 264/113 |
| 4,241,007 | 12/1980 | Tanaka | 264/324 |
| 4,279,952 | 7/1981 | Kodama et al. | 264/29.5 |
| 4,309,245 | 1/1982 | Tworek | 264/324 |
| 4,341,830 | 7/1982 | Betts et al. | 264/29.5 |
| 4,350,672 | 9/1982 | Layden et al. | 264/29.1 |
| 4,412,854 | 11/1983 | Layden | 264/113 |
| 4,414,011 | 11/1983 | Layden et al. | 264/118 |
| 4,428,763 | 1/1984 | Layden | 264/125 |

FOREIGN PATENT DOCUMENTS 58-51525  11/1983  Japan ...................... 264/29.1

*Primary Examiner*—Jeffery Thurlow
*Attorney, Agent, or Firm*—Alan C. Cohen

[57] ABSTRACT

The present invention discloses a method of making fiber reinforced glass, glass-ceramic or ceramic matrix composite articles. The method comprises forming the matrix material into fibers and then into yarn which is woven or knitted into cloth. The matrix cloth is then cut into preformed shapes and interleaved with preformed pieces of fabric which have been woven or knitted from yarn containing the fiber reinforcement. The interleaved preformed structure is then placed in a die and densified under pressure and temperature to form the composite article. Also disclosed is a method wherein the yarn of reinforcing fiber and matrix fibers is woven or knitted together to form a hybrid cloth. This hybrid cloth is then cut into predetermined forms and placed in a die and densified under heat and pressure to form the composite article. Further, a hybrid cloth comprising yarn of both matrix and reinforcing fibers may be formed and then cut into predetermined forms, placed in a die and densified under heat and pressure forming a component article. In addition, these fibers and yarns may be formed into near net structures which can then be densified to form complex composite articles.

5 Claims, 6 Drawing Figures

METHOD FOR FORMING COMPOSITE ARTICLES OF COMPLEX SHAPES

CROSS REFERENCE TO RELATED APPLICATION

This application relates to U.S. application Ser. No. 602,285 filed on even date herewith by Karl M. Prewo and George K. Layden for METHOD FOR FORMING FIBER REINFORCED COMPOSITE ARTICLES.

TECHNICAL FIELD

The field of art to which this invention pertains is molding processes, and particularly molding processes for forming fiber reinforced composite articles.

BACKGROUND ART

Due to the increasing cost, as well as the increasing scarcity, of many conventional metals used in the formation of high temperature structural components, increased emphasis has been placed on fiber reinforced composite articles which can take the place of their metal counterparts.

Techniques have been disclosed which describe fabrication processes for making fiber reinforced glass or glass-ceramic composites, four of which are commonly assigned U.S. Pat. Nos. 4,314,852; 4,412,854; 4,428,763; and 4,324,843, the disclosures of which are incorporated by reference herein.

Typically, such techniques incorporate the preparation of the matrix material into a slurry with an organic binder, drawing the reinforcing fibers through the slurry, coating the fibers, winding the coated fibers on a take-up reel, and drying the coated fibers forming a matrix impregnated tape. The matrix impregnated tape is then cut into desired lengths or shapes and laid up in proper fiber orientation, after which they are placed in an oven to burn off the binder. Then the lay-up is carefully placed in a mold and densified under heat and pressure forming the composite.

There are a number of disadvantages associated with this composite article manufacturing technique. One is that the removal of the organic binder which is used with the slurry matrix to improve the adhesion of the matrix to the fibers during the tape forming step, introduces an extra step which adds labor costs as well as energy costs to the process. In addition, such fugitive binders can be a source of unwanted impurities in the resultant composite. Another disadvantage is that the preparation of the slurry and its application onto the fibers, as well as the formation of the tape, is time-consuming and adds additional costs to the final article. Thirdly, the matrix is not always uniformly applied to the fibers, which may then create a nonuniform composite article. In addition, with the use of these processes, complex or three-dimensional composite structures are difficult to make.

Therefore, what is needed in this art is a method of manufacturing fiber reinforced composite articles which is less complex, less labor and energy intensive and allows for easier production of complex composite articles.

DISCLOSURE OF INVENTION

The present invention discloses a method of making fiber reinforced composite articles comprising forming a glass, glass-ceramic or ceramic matrix material into fibers, forming these fibers into yarn, then weaving, braiding, or knitting the yarn into a homogenous cloth of the matrix material. Preparing fibers of reinforcing material; preparing yarns of the reinforcing fibers and and then knitting or weaving these yarns into a homogenous cloth of fiber reinforcement. Cutting a plurality of preforms of predetermined shape from each of the cloths, interleaving the fiber reinforcing cloth preforms with one or more layers of the matrix cloth preforms forming a lay-up; placing this lay-up in a die and densifying it under heat and pressure to form the composite article.

Another aspect of this invention is the formation of a hybrid cloth material, which is formed by weaving or knitting the yarns of both the glass, glass-ceramic or ceramic matrix material and the fiber reinforcement material into a single cloth; cutting a plurality of preforms of predetermined shape from this cloth, stacking the preforms to form a lay-up, placing the lay-up in a die and densifying it under heat and pressure to form the composite article.

Yet another aspect of this invention is the formation of an alternative hybrid cloth to that described above using a hybrid yarn comprising fibers of matrix material and fibers of reinforcement material, knitting or weaving these yarns to form a cloth, cutting a plurality of preforms of predetermined shape form this hybrid cloth, stacking said preforms to form a lay-up, placing the lay-up in a die and densifying it to form the composite article.

Still yet another aspect of the present invention is the knitting or braiding of a near net structure of continuous matrix yarn and continuous reinforcing fibers or yarn, then densifying the structure in a die to form the composite article.

Other features and advantages will be apparent from the specification and claims and from the accompanying drawings which illustrate an embodiment of the invention.

BEST MODE FOR CARRYING OUT THE INVENTION

Figure 1:
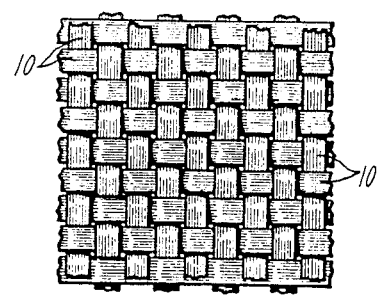
FIG. 1 shows a typical cloth fabric of matrix yarn material.

Any glass, glass-ceramic or ceramic material which can be formed into fibers, may be used as the matrix material. The choice of which material to use as a matrix will depend on the particular properties desired in the final composite article. Some of the matrices will have greater thermal stability, or higher fracture toughness or be more compatible with a particular reinforcing fiber. These features as well as others will determine which matrix to select. For instance, when forming a composite of glass-ceramic matrix and silicon carbide fibers, the matrix material must be substantially titanium free in order to form a satisfactory composite. A number of glass matrices which may prove useful in practicing this invention, are E-Glass, Corning 1723 aluminosilicate glass, Corning 7740 borosilicate glass and Corning 7930 high silica content glass (96% by weight silica). In addition, some glass-ceramic matrices are lithium aluminosilicate, aluminosilicate and magnesium aluminosilicate, while a representative ceramic material is mullite.

The glass, glass-ceramic or ceramic matrix is then formed into continuous fibers by any conventional technique, such as spinning. The diameters and lengths of the fibers which are produced are not critical, nor is the shape (i.e. flat, oval or circular, etc.). However, it is preferred that the fibers be substantially round in shape and have a diameter ranging from about 1 micron to about 25 microns, with 5 to 15 microns preferred. It is important to form the matrix into a fiber which may then be formed into a yarn which may be woven, braided or knitted into a cloth using conventional techniques. The yarn may comprise a single monofilament fiber or comprise as many as several hundred or more fibers. Typically, the yarn contains about 250 fibers or more.

The fiber reinforcement may be any conventional composite reinforcement materials, i.e. carbon, graphite, silicon carbide, alumina, etc., and may be formed using any of the conventional fiber forming techniques, i.e. drawing, spinning, etc. The limiting factor in selecting the reinforcement material is its thermal compatibility with the temperatures required to densify the matrix and the physical compatibility, (i.e. coefficients of thermal expansion should be closely matched, reactivity, etc.), between it and the matrix. The particular reinforcement material chosen will also depend on the properties desired in the final composite article. Again the diameter, length and design of the fibers is not critical. However, it is preferred that the fibers be substantially round and have a diameter ranging from about 5 microns to about 200 microns with about 5 to about 150 microns preferred.

The reinforcing continuous fibers may then be formed into yarn comprising, typically, as many as 250 or more fibers. Such yarn should be formed such that it may then be woven or knitted or braided into a cloth using conventional techniques.

While the invention has been described in terms of forming the reinforcement and matrix material into fibers and yarns, it can be appreciated that this step can be eliminated and the reinforcement and matrix fibers or yarns may be purchased commercially.

It is contemplated that monofilament fibers may be used to braid, weave or knit the cloth directly, thereby eliminating the extra step of forming the yarn. It is felt that such fibers would have larger diameters than those used for production of the yarns. In addition, such fibers should have the flexibility and strength to allow them to be used in these braiding, weaving and knitting processes.

Figure 2:
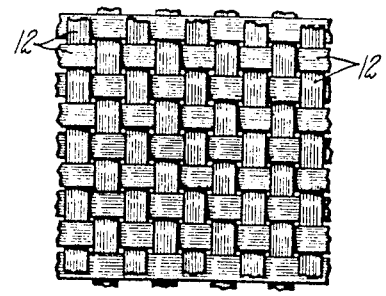
FIG. 2 shows a typical cloth fabric of fiber reinforcing yarn.

The yarns of matrix fibers and reinforcement fibers are then woven or knitted to form a cloth. This cloth may be homogenous in nature as shown in FIGS. 1 and 2. These cloths contain all matrix yarn 10 or all reinforcement yarn 12 respectively. The weaving may be performed using conventional techniques yielding conventional weave patterns such as plain, twill or satin as well as more elaborate weaves such as gauze, pile or lappet. The knitting processes are also conventional, typically the cloth will be knitted in warp or weft design. These cloths are prepared such that the fibers are oriented substantially at 90° to each other. However, this invention should not be so limited and it may be desirable to form the cloth such that the fibers are oriented at any of a variety of multiple angles, such as 0/±30°, 0/±60°, 0/±45°, or 0/±45°/90°.

Figure 3:
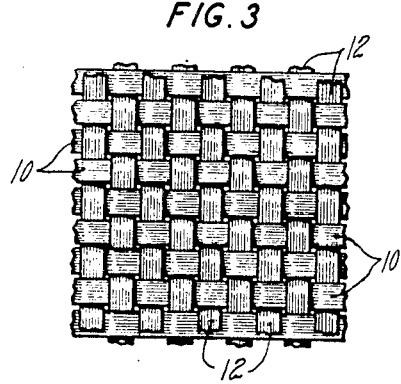
FIGS. 3 and 4 show a typical cloth fabric comprising yarns of both matrix and fiber reinforcing material.
Figure 4:
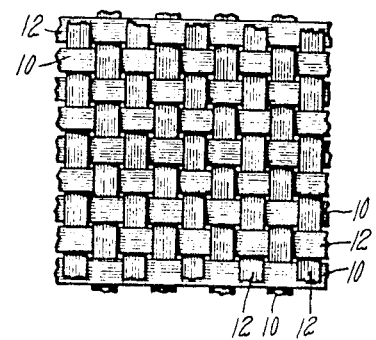

In addition to forming homogenous cloth of matrix yarn or reinforcement yarn, the cloth may also be formed as a hybrid cloth (FIGS. 3 and 4) having a mixture of matrix yarn 10 and reinforcement yarn 12. In preparing such cloth, it does not matter which yarn is used for the warp and which is used for the weft.

Figure 5:
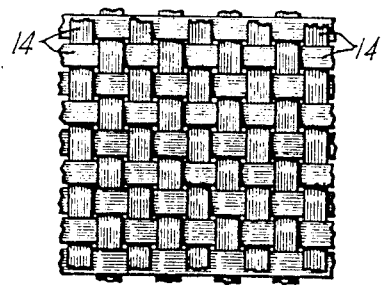
FIG. 5 shows a typical hybrid cloth wherein the yarns comprise a mixture of matrix fibers and reinforcing fibers.
Figure 6:
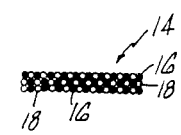
FIG. 6 shows a cross section of a hybrid yarn comprising both matrix and reinforcing fibers.

Also, it is possible to prepare a hybrid cloth (FIG. 5) wherein the yarn 14 (FIG. 6) itself is prepared from both matrix fibers 16 and reinforcement fibers 18. These hybrid yarns would then be formed into cloth using conventional techniques.

It is also possible to form a tri-component system in which two different continuous reinforcing fibers may be used in combination with a single matrix. In particular, the simultaneous use of a large diameter reinforcing monofilament and a reinforcing yarn can provide tailored performance advantages.

In preparing the hybrid cloths of matrix material and reinforcement materials, the matrix material present in the cloth typically ranges from about 30% to about 70% by volume of solids, with a preferred range of about 40% to about 60% by volume of solids. Therefore, these cloths will result in a composite article having the desired matrix material content which is typically from about 30% to about 70% with 40% to 60% by volume preferred.

After homogenous cloths of both the matrix material and the fiber reinforcing material have been formed, preforms are cut from each of the cloths and stacked to form a lay-up. Since composite articles typically comprise from about 30% to about 70% by volume of matrix material with a preferred range of about 40% to about 60% by volume, the number of preforms placed in the lay-up should be chosen in order to form a composite having this makeup. When forming the lay-up, using homogenous cloths, it is necessary to interleave homogenous matrix cloth preforms with the reinforcement cloth preforms so that the matrix material will be more uniformly distributed throughout the final composite article after densification. The lay-up is then placed in a conventional, densifying die and densified under sufficient pressure and temperature to cause the matrix material to flow substantially uniformly around the fiber reinforcement.

It should be noted that the interleaving step during the formation of the lay-up is not necessary where a hybrid cloth of the matrix material and reinforcement material is used, because the matrix is already intimately distributed throughout the lay-up.

The densification process for the hybrid cloth lay-ups and the homogenous cloth lay-ups is the same. The temperatures, pressures and residence times to which the lay-ups are subjected should be high enough to soften the matrix material and cause it to flow around the fibers but not so high as to damage the reinforcing fibers themselves. Typically, the pressure ranges from about 1.7 to about 13.8 MPa (250 to 2,000 psi) and temperatures of about 1050° C. to about 1700° C. with residence times of about 15 minutes for glass, glass-ceramic matrices, or ceramic matrices. A preferred pressure range is about 3.4 MPa to about 6.9 while a preferred temperature range is from about 1100° C. to 1500° C. These conditions will vary depending on the article being formed.

Also encompassed in the scope of this invention is the process of forming, by weaving, knitting or braiding, a near net structure comprised of continuous fibers or yarn of both the reinforcing and matrix materials. The yarns or fibers used may be any of the combinations described herein. This weaving, knitting or braiding results in an article with continuous fibers throughout the resulting composite structure. Such three-dimensional articles may be initially formed using conventional knitting techniques with the preferred being the Magnaweave process, described in U.S. Pat. No. 4,312,261 and is incorporated herein by reference.

This process achieves the total three-dimensional integration of the yarns or fibers by using an orthogonal shedding motion which is followed by a combing or compacting motion. This process allows for a high degree of freedom in the control of yarn or fiber distribution or orientation, to form the near net structure. The structure is then placed in an appropriate die and densified under suffcient temperature and pressure to cause the matrix to flow about the fibers forming the composite article.

EXAMPLE

A composite article three inches by three inches by 0.045 inch utilizing the present method was prepared as follows:

Eight, three-inch by three-inch squares were prepared from Thornel 300 (Union Carbide) plain weave (PW) carbon cloth. The cloth had a weave of 12×12 yarns per inch and an areal density of 0.118 g/in$^2$. The total weight of the fabric was 8.59 g.

Fourteen, three-inch by three-inch squares of plain weave E-glass were also prepared from cloth having 57×54 yarns per inch and an areal density of 0.195 g/in$^2$. The total weight of the glass was 24.56 g. The squares were laid up one on top of the other in the sequence of one square of Thornel, then two squares of glass, then one square of Thornel, etc. to a height of about 0.5 cm.

When the lay-up was complete, it was then placed in a conventional graphite hot press die assembly which had been lightly coated with boron nitride which acts as a release agent. A piece of molybdenum foil was placed between the die plunger and the lay-up also to facilitate releasing the composite from the mold.

The die assembly was then placed in a hot press and heated to a temperature of about 1350° C. When the temperature of the plunger reached 1100° C., the pressure was raised to 1000 psi. The composition was kept under pressure at elevated temperature for fifteen minutes, then while still under pressure, the heater was turned off and the die was cooled to about 400° C. The pressure was then removed and after the composite had cooled to room temperature (about 25° C.), it was removed from the die.

A cross-section of the composite showed excellent penetration and distribution of the glass matrix throughout the composite. The physical properties (i.e. flexural strength 9,000–15,000 psi) of the composite formed using this method were the same as those expected when the composite is prepared using more conventional methods and these materials.

The present method offers an alternate technique to forming fiber reinforced articles having a glass, glass-ceramic or ceramic matrix. This method will allow for the elimination of a number of labor intensive and costly steps in the preparation of such articles. This is done by eliminating the preparation of a slurry of the matrix and then coating the fibers to form a tape which may then be formed into the shape of the articles and densified. In addition, an organic binder is typically used in the preparation of these tapes and must be removed prior to densification. In addition, the present method offers greater uniformity and control over the matrix material during the lay-up and in the final composite article. In addition, this method offers an easier way to make complex, three-dimensional composite articles. The improved purity of the resultant composite, by removal of the need for a fugitive binder, is also of great importance.

Also, the process employing the braided or knitted near net structures allows for the formation of complex configured composite articles with superior properties due to the interweaving of the continuous yarns or fibers within the composite article. Such a process lends itself to computer aided design of such structures as I-beams, channels, tubes, etc.

Recent advances in computer-aided design, analysis, and fabrication of fully integrated three-dimensional (3-D) woven, knitted, and braided fiber structures promise to lead to major advances in composite technology. Through-thickness strength imparted to composites by virtue of such integrated reinforcement will open new applications for composites that could not be considered formerly because of the relatively poor transverse strength and interlaminar shear properties of traditional ply lay-up composite structures.

It should be understood that the invention is not limited to the particular embodiments shown and described herein, but that various changes and modifications may be made without departing from the spirit and scope of this novel concept as defined by the following claims.

We claim:

1. A method of making fiber reinforced glass, glass-ceramic or ceramic matrix composite articles particularly adapted to making such articles in complex shapes comprising:
    forming a matrix material into matrix fibers,
    forming the matrix fibers into matrix yarn,
    forming a reinforcing material into reinforcing fibers,
    forming the reinforcing fibers into reinforcing yarn,
    forming a hybrid cloth of the matrix yarn and the reinforcing yarn, wherein the matrix yarn comprises about 30% to about 70% by volume of the cloth,
    cutting a plurality of preforms of predetermined pattern from the hybrid cloth,
    forming a stack of the preforms to a predetermined height,
    placing the stack in a die, and
    applying sufficient heat and pressure to cause the matrix material to flow about the reinforcing fibers forming the composite article.

2. A method of making fiber reinforced glass, glass-ceramic or ceramic matrix composite aricles particularly adapted to making such articles in complex shapes comprising:
    forming a matrix material into matrix fibers,
    forming a reinforcing material into reinforcing fibers,
    forming a hybrid yarn comprising matrix fibers and reinforcing fibers, wherein the hybrid yarns comprise about 30% to about 70% by volume of matrix fibers, forming a hybrid cloth of the yarn, cutting a plurality of preforms of predetermined pattern from the hybrid cloth, forming a lay-up of the preforms of predetermined height, placing the lay-up into a die, and applying sufficient heat and pressure to cause the matrix material to flow about reinforcing fibers forming the composite article.

3. A method of forming a fiber reinforced glass, glass-ceramic or ceramic matrix composite article comprising:

forming a matrix material into continuous matrix fibers, forming the matrix fibers into a matrix yarn, forming a reinforcing material into continuous reinforcing fibers, forming the reinforcing fibers into a reinforcing yarn, knitting or braiding the matrix yarn and reinforcing yarn into a structure of near net shape wherein the matrix yarn comprises from about 30% to about 70% by volume of the structure, placing the structure in a die and applying sufficient heat and pressure on the structure to cause the matrix to flow about the reinforcing fibers to form a composite article.

4. The method of claim 3 wherein the reinforcing fibers and matrix fibers are formed into a hybrid yarn prior to being formed into the near net structure.

5. The method of any one of claims 1, 2 or 3 wherein the fiber reinforcement yarn is a monofilament.

* * * * *